United States Patent
Choi et al.

(10) Patent No.: US 11,841,284 B2
(45) Date of Patent: Dec. 12, 2023

(54) PARTICLE TRAPPING APPARATUS FOR PREVENTING AN ERROR OF A PRESSURE MEASUREMENT

(71) Applicant: Adaptive Plasma Technology Corp., Icheon-si (KR)

(72) Inventors: Woo Hyung Choi, Seongnam-si (KR); Sang Woo Lee, Suwon-si (KR); Hwi Gon Jang, Yongin-si (KR); Gyoung Ho Kwon, Daejeon (KR)

(73) Assignee: ADAPTIVE PLASMA TECHNOLOGY CORP., Icheon-si (KR)

( * ) Notice: Subject to any disclaimer, the term of this patent is extended or adjusted under 35 U.S.C. 154(b) by 0 days.

(21) Appl. No.: 17/703,473

(22) Filed: Mar. 24, 2022

(65) Prior Publication Data

US 2023/0324246 A1 Oct. 12, 2023

(51) Int. Cl.
*G01L 19/06* (2006.01)
*G01L 9/00* (2006.01)

(52) U.S. Cl.
CPC ........ *G01L 19/0636* (2013.01); *G01L 9/0041* (2013.01)

(58) Field of Classification Search
CPC .................................................. G01L 19/0636
See application file for complete search history.

(56) References Cited

U.S. PATENT DOCUMENTS

| 6,451,159 | B1 | 9/2002 | Lombardi et al. | |
| 6,901,808 | B1* | 6/2005 | Sharpless | G01L 19/0636 73/718 |
| 2003/0167852 | A1* | 9/2003 | Traverso | G01L 19/0636 73/756 |
| 2004/0226382 | A1* | 11/2004 | Lischer | G01L 9/0075 73/724 |
| 2022/0199380 | A1* | 6/2022 | L'Heureux | C23C 16/4412 |

FOREIGN PATENT DOCUMENTS

DE 202011100428 U1 * 9/2011 ......... G01L 19/0636

* cited by examiner

*Primary Examiner* — Herbert K Roberts
(74) *Attorney, Agent, or Firm* — CANTOR COLBURN LLP

(57) ABSTRACT

Provided is a particle trapping apparatus for preventing an error of a pressure measurement. A particle trapping apparatus for preventing an error of a pressure measurement includes a pressure-measuring means; a measuring pipe for connecting the pressure-measuring means to a processing chamber; and a trapping means for capturing particles in a gas flowing through the measuring pipe, wherein the trapping means is coupled to the measuring pipe or is a portion of the measuring pipe.

2 Claims, 6 Drawing Sheets

PARTICLE TRAPPING APPARATUS FOR PREVENTING AN ERROR OF A PRESSURE MEASUREMENT

BACKGROUND OF THE INVENTION

Field of the Invention

The present invention relates to a particle trapping apparatus for preventing an error of a pressure measurement, in particular the particle trapping apparatus for preventing the error of the pressure measurement by removing particles to flow into a measuring device such as a manometer in advance.

Description of the Related Art

A manometer may be connected to a processing chamber for measuring a pressure of the processing chamber, and the vacuum degree appropriateness of the processing chamber may be determined based on a measuring value of the manometer. The manometer for measuring the pressure of the processing chamber may have a structure of converting an electric capacity of an elastic diaphragm into a pressure value. But by-products may be generated in a course of an etching processing or the like, and the by-products may change an elastic property of the diaphragm to cause a measuring error of the manometer. In particular, particles generated in the course of the etching process and floating within the processing chamber may flow along a guiding pipe, and may be stuck on a surface of the elastic diaphragm to change the elastic property. And the particles stuck on the surface may cause a measuring error. U.S. Pat. No. 6,451,159 discloses a method for measuring a pressure in a plasma device. And U.S. Pat. No. 6,901,808 discloses a capacitive manometer for a gas pressure. It is advantageous that a foreign matter such as the particles to be stuck on the surface of the diaphragm is removed in advance. For example, it is necessary for the particles to be removed at a measuring pipe connecting the manometer to the chamber.

PURPOSE OF THE INVENTION

The purpose of the present invention is to provide with a particle trapping apparatus for preventing an error of a pressure measurement, wherein the trapping apparatus is displaced at a measuring pipe connecting a pressure-measuring means to a processing chamber for trapping floating particles.

SUMMARY OF THE INVENTION

In one embodiment of the present invention, a particle trapping apparatus for preventing an error of a pressure measurement comprises a pressure-measuring means; a measuring pipe for connecting the pressure-measuring means to a processing chamber; and a trapping means for capturing particles in a gas flowing through the measuring pipe, wherein the trapping means is coupled to the measuring pipe or is a portion of the measuring pipe.

In other embodiment of the present invention, the trapping means further comprises a heat regulating means for regulating a temperature of the gas.

In another embodiment of the present invention, the trapping means further comprises a filtering block for capturing the particles.

In still another embodiment of the present invention, the filtering block comprises a plurality of porous plates, and holes formed in the adjacent plates are located on different straight lines according to the flowing direction.

In still another embodiment of the present invention, the trapping means comprises an aluminum porous plate made through an anodizing process.

In still another embodiment of the present invention, the trapping means may be a porous plate block with a plurality of porous plates laminated separately each other.

In still another embodiment of the present invention, the apparatus further comprises a flowing block for flowing a cooling water.

In still another embodiment of the present invention, the trapping means becomes a porous capturing chamber, and the porous capturing chamber comprises a capturing body extending in a cylindrical shape; an entering porous plate forming a front surface of the capturing chamber; and a discharging porous plate forming a rear surface of the capturing chamber.

DETAILED DESCRIPTION OF EXEMPLARY EMBODIMENTS

Exemplary embodiments of the present invention will be described herein below with reference to the accompanying drawings.

Figure 1:
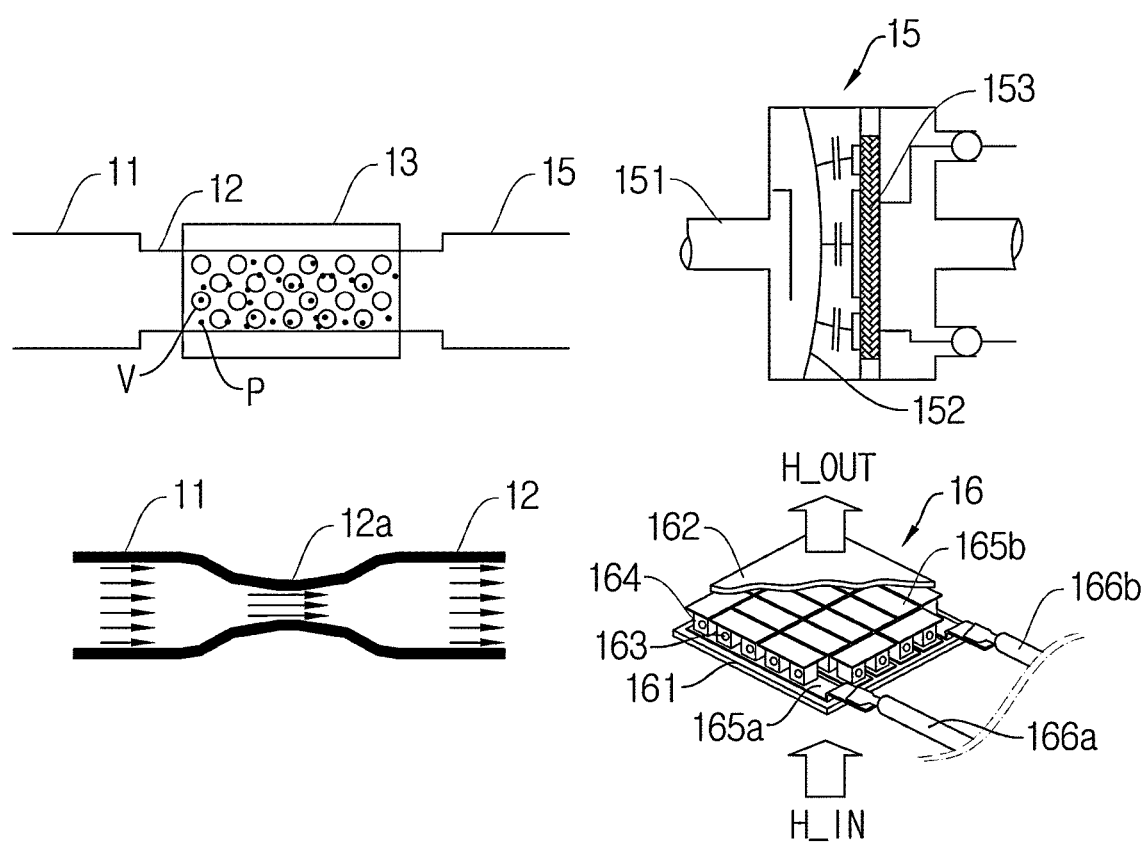
FIG. 1 shows an exemplary embodiment of a particle trapping apparatus for preventing an error of a pressure measurement according to the present invention.

FIG. 1 shows an exemplary embodiment of a particle trapping apparatus for preventing an error of a pressure measurement according to the present invention.

Referring to FIG. 1, a particle trapping apparatus for preventing an error of a pressure measurement comprises a pressure-measuring means 15; a measuring pipe 12 for connecting the pressure measuring means 15 to a processing chamber 11; and a trapping means for capturing particles in a gas flowing through the measuring pipe 12, wherein the trapping means is coupled to the measuring pipe 12 or is a portion of the measuring pipe 12.

The processing chamber 11 may be a chamber for manufacturing a semiconductor, and various processes may be performed in the processing chamber 11. An inner pressure of the processing chamber 11 may be measured before, in a course of or after performing a process, and the processing condition may be determined based on the measured pressure. The pressure measuring means 15 may be a manometer connected to the processing chamber in a way that a gas flows between the manometer and the processing chamber 15. The pressure measuring means 15 comprises an inflowing tube 151 for inflowing the gas; a measuring membrane 152 for measuring a pressure applied by the gas; and a detecting sensor 153 for detecting the pressure applied on the measuring membrane 152, wherein the measuring membrane 152 may be a diaphragm. The trapping means for capturing the particles may be arranged at the measuring tube 12, and the particles P flowing together with the gas along the measuring tube 12 can be captured by the trapping means.

According to one embodiment of the present invention, the trapping means may be a temperature regulating means for regulating a temperature of the gas. For example, the temperature regulating means may be a cooling means for cooling the flowing gas, and may be a thermoelectric module 16 or a cooling jacket surrounding the measuring tube 12. The temperature regulating means may be a jacket block 13 surrounding a portion of the measuring tube 12, and the jacket block 13 may comprise at least one flowing line for flowing a cooling fluid or the thermoelectric module 16 for generating a thermoelectric effect. The jacket block 13 may comprise a heat conductive material, for example, and various cooling line may be formed for flowing a cooling water or a cooling gas. As the cooling fluid flows along the cooling line to cool the gas for making a portion of the gas be fine particles, the particles P may be captured to be prevented from entering the pressure measuring means 15. And also, the jacket block 13 may comprise the thermoelectric module 16, and the thermoelectric module 16 may comprise a pair of insulating plates 161, 162 for absorbing a heat H_IN and discharging the heat H_OUT; a pair of conductive plates 165a, 165b placed within the pair of the insulating plates 161, 162; and N Type semiconductor 163 and P type semiconductor 164 arranged between the pair of conductive plate 165a, 165b. Each semiconductor 163, 165 may be fixed on each conductive plate 165a, 165b made of copper, and each insulating plate 161, 162 made from an insulating material and with a large heat conductive capacity may be coupled to an outside of each conductive plate 165a, 165b. If a power is supplied to each semiconductor 163, 164 through each electrode 166a, 166b, then one conductive plate 165a can be cooled to absorb the heat from the gas flowing along the measuring tube 12. And then the absorbed heat may be discharged through the other conductive plate 165b and the other insulating plate 162.

Referring to the lower part of FIG. 1, at least one portion of the measuring tube 12 may become a venturi pipe 12a. The ventrui pipe 12a may generate a diffusive effect within the measuring tube 12 to capture the particles. The jacket block 13 may be arranged at the venture tube 12a or in a rear part of the venture pipe 12a. The measuring tube 12 may have various structures for a cooling effect, and the jacket block 13 may comprise various cooling means. The trapping means may comprise a filter block together with the jacket block 13 or without the jacket block 13.

Figure 2:
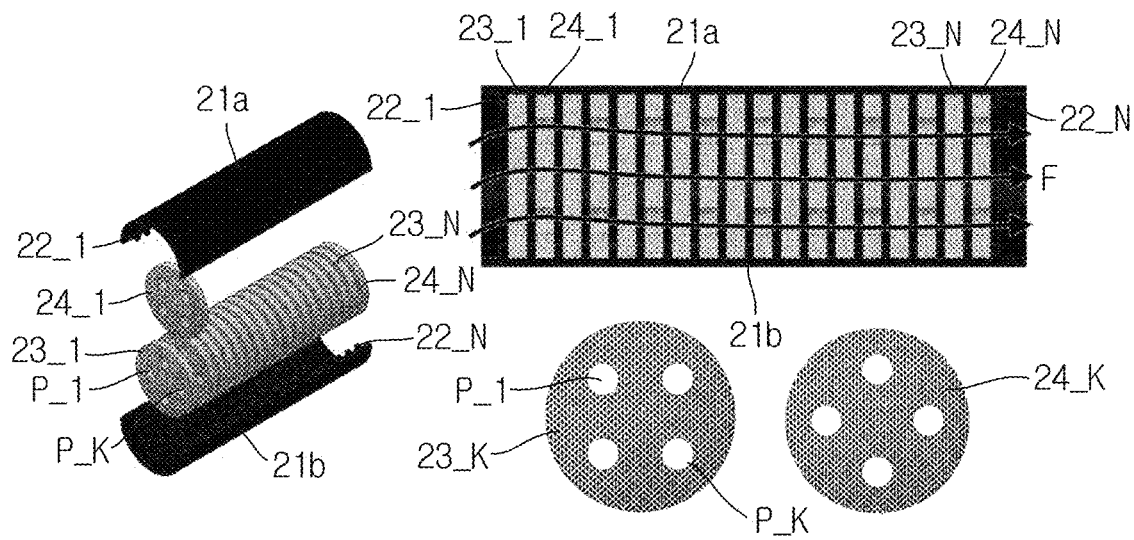
FIG. 2 shows other exemplary embodiment of a particle trapping apparatus for preventing an error of a pressure measurement according to the present invention.

FIG. 2 shows other exemplary embodiment of a particle trapping apparatus for preventing an error of a pressure measurement according to the present invention.

Referring to FIG. 2, the trapping means may become a filter block for capturing particles. The filter block comprises a plurality of porous plates 23_1 to 23_K containing a plurality of holes and arranged consecutively, and holes formed in the adjacent plates are located on different parallel straight lines along the flowing direction. The particles may be captured by the filter block, and the filter block may comprise at least one filter. The filter block may comprise a pair of filter cases 21a, 21b having a hollow cylindrical shape; and at least one porous plate 23_1 to 23_K arranged within the pair of the filter cases 21a, 21b. The pair of filter cases 21a, 21b may be combined to become the cylindrical shape, and a plurality of fixing tab 22_1 to 22_N may be formed on an inner surface of each filter case 21a, 21b and arranged separately and successively each other along the longitudinal direction of each filter case 21a, 21b. The porous plates may be secured within the filter cases 21a, 21b with the fixing tab 22_1 to 22_N. Each porous plate 23_1 to 24_N may have a circular shape, and different porous plates 23_1 to 24_N may have a similar or an identical structure each other. The plurality of holes P_1 to P_K may be form at each porous plate 23_1 to 24_N. Each porous plate 23_1 to 24_N may have an identical shape or a similar shape, and the plurality of holes P_1 to P_K may be formed at identical or similar locations. When the adjacent porous plates 23_1 to 24_K are arranged, the holes P_1 to P N formed at the adjacent porous plates 23_1 to 24_K may be located in different positions along the gas flowing direction. Specifically, a first porous plate 23_1 of a first group and a first porous plate 24_1 of a second group may comprise a plurality of holes P_1 to P_K formed at a similar or identical positions, and then the first porous plate 24_1 of the second group may be rotated in a predetermined angel to the first porous plate 23_1 of the first group in a course of being arranged within the filter cases 21a, 21b. Therefore, the holes formed at the first porous plate 24_1 of the second group may be deviated from the holes formed at the first porous plate 23_1 of the first group. As such the porous plates 23_1 to 24_N arranged with the pair of filter cases 21a, 21b consists of the first group plates 23_1 to 23_N and the second group plates 24_1 to 24_N arranged between the first group plates 23_1 to 23_N, wherein the holes P_1 to P_K of the second group plates 24_1 to 24_N may be positioned in a deviated direction to the holes P_1 to P_K of the first group plates 23_1 to 23_N. As mentioned above, the plurality of porous plates 23_1 to 24_N may be arranged within the pair of filter cases 21a, 21b in a way that each porous plate 23_1 to 24_N is separated in a predetermined distance. The gas may form a gas stream F within the pair of the filter cases 21a, 21b, and the gas stream F may be bent in a course of passing the adjacent porous plates 23_1 to 24_N. The particles may be adhered on surfaces of the porous plates 23_1 to 24_N by the gas stream F flowing along a curved line. The porous plates 23_1 to 24_N may be made of various materials, for example aluminum or the like. A process for manufacturing the porous plates 23_1 to 24_K will be explained below.

Figure 3:
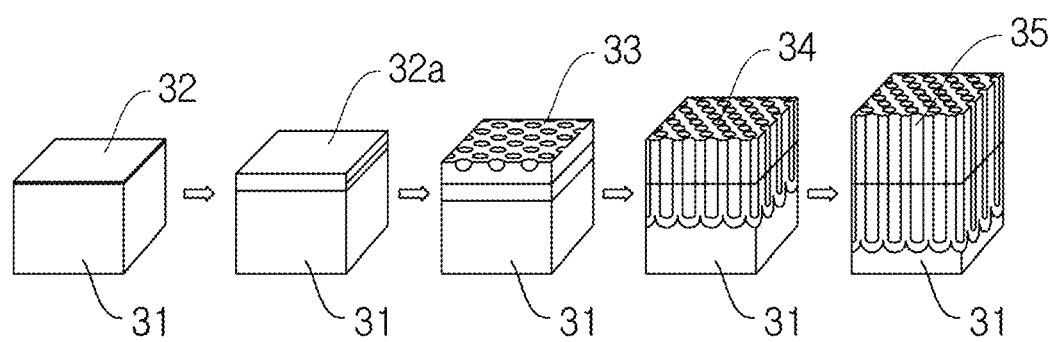
FIG. 3 shows an exemplary embodiment of a method for producing a porous block for the particle trapping apparatus according to the present invention.

FIG. 3 shows an exemplary embodiment of a method for producing a porous block for the particle trapping apparatus according to the present invention.

Referring FIG. 3, the trapping means may become an aluminum porous plate formed by anodizing process. An aluminum base 32 may be placed on a base block 31, and an oxidized film layer with a 0.5 to 10.0 nm thickness may be formed on the aluminum base 32 by oxidization in the air. The aluminum base 32 with the oxidized film layer may be immersed into an electrolytic base where a sulfate is dissolved to form an oxidized layer 32a in a shape of a barrier. If the electrolytic process may be continued after the oxidized layer 32a formed, then an aluminum sulfate may be generated and the fine porous layer 33 may be formed. And then an oxidative reaction and an elution reaction may be maintained for forming a uniform porous layer 34. A thickness of the porous layer may depend on the electrolytic process time and the anodizing time, and finally a porous film layer 35 with 5.0 to 100.0 nm diameter can be obtained. And the aluminum anodizing porous plate can be made from the porous film layer 35.

Figure 4:
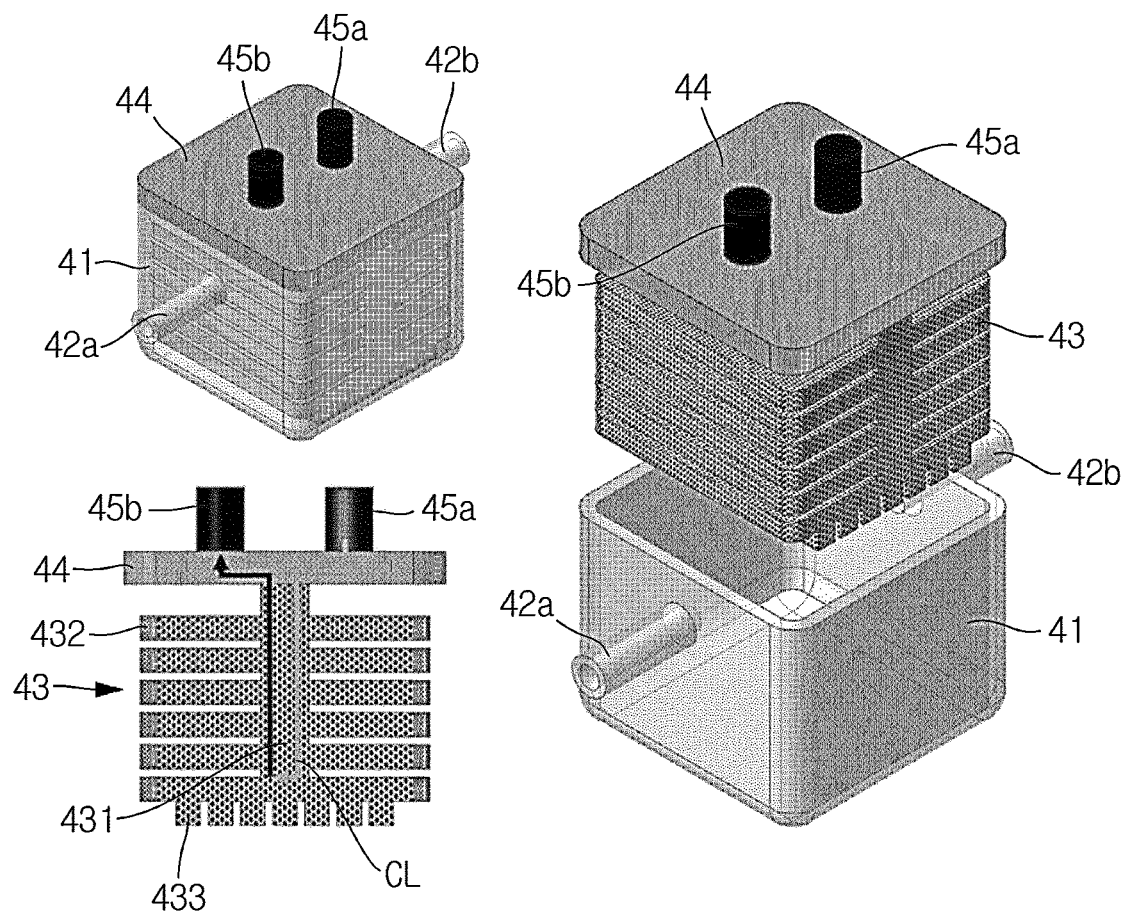
FIG. 4 shows another exemplary embodiment of a particle trapping apparatus for preventing an error of a pressure measurement according to the present invention.

FIG. 4 shows another exemplary embodiment of a particle trapping apparatus for preventing an error of a pressure measurement according to the present invention.

Referring FIG. 4, the trapping means may be a porous plate block with a plurality of porous plates laminated separately each other. Each porous plate 432 may be manufactured by the method mentioned above, and each porous plate 432 may become a rectangular shape in general. The plurality of porous plates 432 may be laminated separately each other along a vertical direction, and a separating plate 431 may be formed at the center part of the plurality of porous plates 432 along a vertical direction. And also, a contacting portion 433 may be formed on a porous plate 432 located at a lowest position. The separating plate 431 may be coupled to a cover 44 protruding upwardly. The porous plate block may be located within a flowing filter case 41 with a hexahedral shape or a box. An inputting tube 42a connected to the processing chamber may be formed at one side of the flowing filter case 41, and a filter tube 42b connected to the pressure measuring means 15 may be formed at the other side of the flowing case 41. The porous plate block may be coupled to the cover, and a cooling line CL may be arranged at the separating plate 431. The cooling line CL may be connected an inlet 45a or an outlet 45b formed at an outside of the cover 44. In this structure if the cover 44 is coupled to the flowing filter case 41, the porous plate block is located within the flowing filter case 41 and the gas input through the inputting tube 42a can flow to the pressure measuring means 15 through filter tube 42b via the porous plate block. Hence, the particles may be captured by the porous plate block in this course. A cooling gas or a cooling water may be input through the inlet 45a to pass the separating plate 431 and to be discharged through the outlet 45b, and it is easy for the particles to be removed by cooling the gas. The porous plate block can be made in various shapes, but not limited to.

Figure 5:
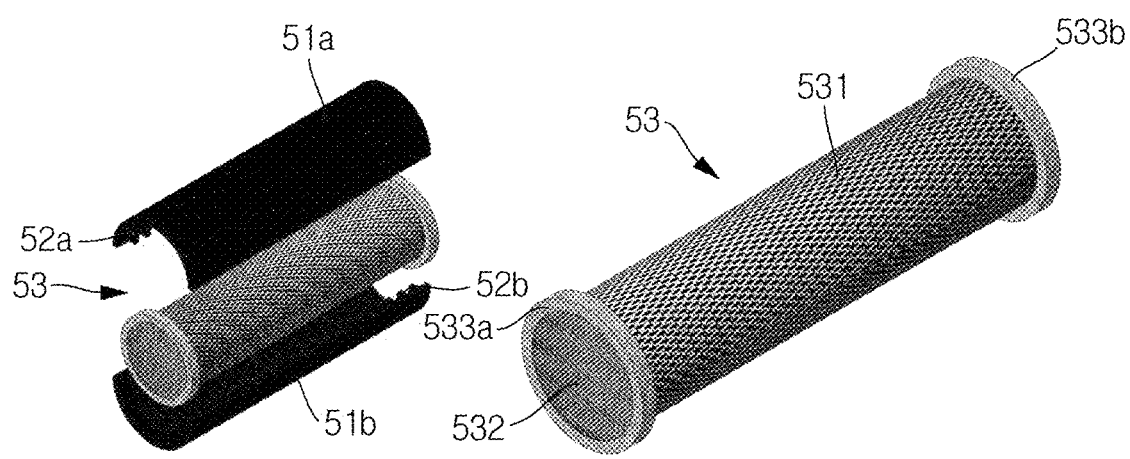
FIG. 5 shows still another exemplary embodiment of a particle trapping apparatus for preventing an error of a pressure measurement according to the present invention.

FIG. 5 shows still another exemplary embodiment of a particle trapping apparatus for preventing an error of a pressure measurement according to the present invention.

Referring to FIG. 5, the trapping means may be a porous capturing chamber 53 with a cylindrical shape and with a porous front surface, a porous rear surface and a porous surrounding surface.

The porous capturing chamber 53 may be a cylindrical shape in general and a gas can flow along an inner part of the porous capturing chamber 53. The porous capturing chamber 53 may comprise a capturing body 531 extending in a cylindrical shape; an entering porous plate 532 formed at a front surface of the capturing body 531; a discharging porous plate formed at a rear surface of the capturing body 531; and fixing borders 533a, 533b formed at a front end part and a rear end part. The capturing body 531 may be made of various materials capable of capturing particles on a surface, and optionally a plurality of pores may be formed uniformly on a surface of the capturing body 531. Or the capturing body 531 may comprise a plurality of holes formed uniformly on an inner surface. The entering porous plate 532 may comprise a plurality of pores with a predetermined diameter size, and hence, some particles with a diameter size above the predetermined size cannot pass the entering porous plate 532 because of the size. The discharging porous plate may have a structure identical or similar to the entering porous plate 532. But the pores at the discharging porous plate may have the same size as that of the entering porous plate 532 or smaller size to that of the entering porous plate 532. The particles may be captured in front of the capturing chamber 53, within the capturing chamber or at the surrounding surface of the capturing chamber 53 owing to this structure. The capturing chamber 53 may be placed within a pair of chamber cases 51a, 51b having a cylindrical shape, and an inner fixing grooves 52a, 52b may be form at a front part and a rear part of the chamber cases 51a, 51b for fixing the fixing borders 533a, 533b of the capturing chamber 53. The porous chamber block having this structure may be arranged within the measuring tube or may connect two parts of the measuring tube explained above.

Figure 6:
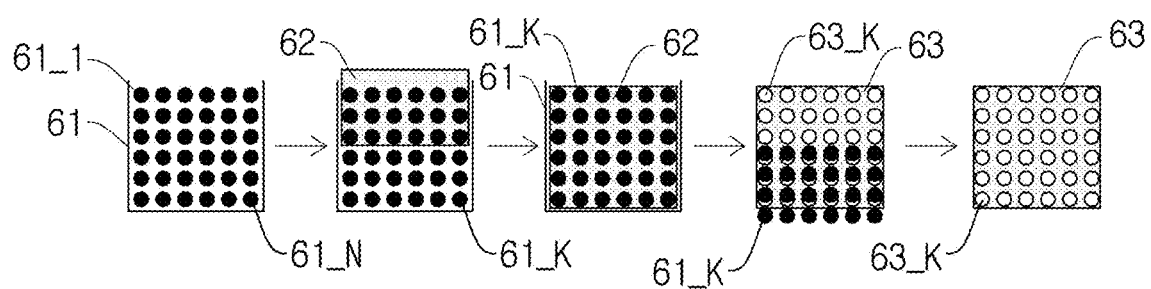
FIG. 6 shows an exemplary embodiment of a method for producing a porous plate for the particle trapping apparatus according to present invention.

FIG. 6 shows an exemplary embodiment of a method for producing a porous plate for the particle trapping apparatus according to present invention.

Referring FIG. 6, the porous plate such as the entering porous plate or the discharging porous plate may have pores with a predetermined diameter size. A molder 61 may be prepared for producing the porous plate with holes having this predetermined diameter size hole, and first material crystals 61_1 to 61_N with a predetermined diameter size may be arranged uniformly on the molder 61.

The first material crystals 61_1 to 61_N may be sodium particles with about 800° C. melting point. After the first material crystals 61_1 to 61_N may be arranged uniformly on the molder 61, a dissolved second material 62 may be injected into the molder 61. The second material 62 may be a liquid form, and the second material 62 may fill gaps formed between the first material crystals 61_1 to 61_N to make a layer. For example, the second material 62 may be an aluminum with about 660° C. melting point. Hence, the melting point of the second material 62 may be lower than that of the first material crystals 61_1 to 61_N. Therefore, a shape made by the first material crystals 61_1 to 61_N may be maintained in a course of being filled on the molder 61 with the second material 62. After the molder 61 is filled completely with the second material 62, the second material 62 may be cooled to form a second layer 63. On this condition, a solution may be injected into the molder 61 for dissolving the first material crystals 61_1 to 61_N to remove the first material crystals 61_1 to 61_N. Hereby, the second material layer 63 with second material pores 63_K formed uniformly can be obtained. The solution may be a water, but not limited to. The entering porous plate, the discharging porous plate and the capturing body explained above may be made from the second material layer 63 with the second material pore 63_K obtained in this manner. The first material crystals 61_1 to 61_N or the second material 62 may be any materials, if the required condition is met.

Figure 7:
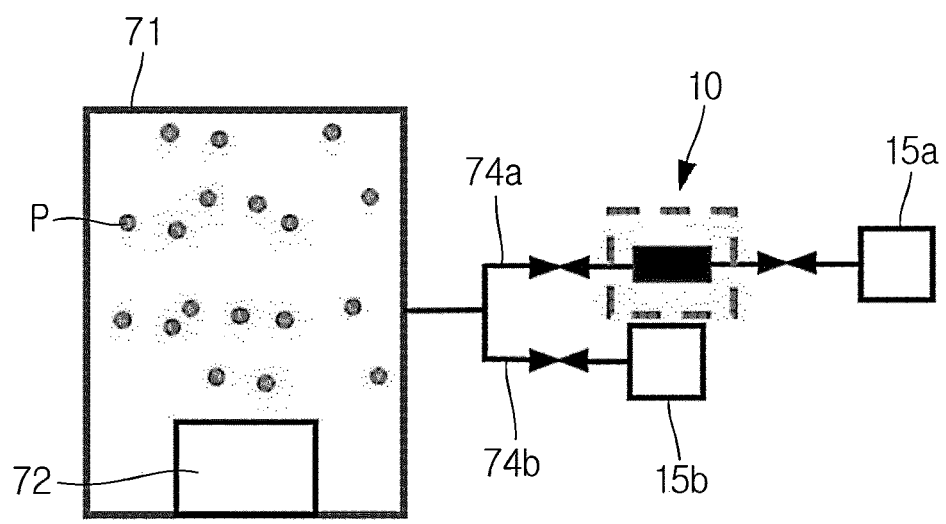
FIG. 7 shows an exemplary embodiment of an application according to the present invention.

FIG. 7 shows an exemplary embodiment of an application according to the present invention.

Referring FIG. 7, an electrostatic chuck 72 may be placed within a processing chamber 71, and a process for a wafer can be performed within the electrostatic chamber 72. A pair of pressure measuring means 15a, 15b may be a pair of manometers, and, one manometer may be connected for measuring about 100 Torr pressure, and the other manometer may be connected for measuring about 5 Torr pressure. A particle trapping apparatus 10 may be coupled to a first measuring tube 74a to connect the processing chamber 71 to the first measuring means 15a for preventing the particles P from entering the first pressure measuring means 15a. An error occurring in a course of measuring the pressure of the processing chamber 71 by the first measuring means 15*a* may be avoided because of the particle trapping apparatus 10. The particle trapping apparatus may be coupled to various pressure measuring means 15*a*, 15*b*, but not limited to.

Figure 8:
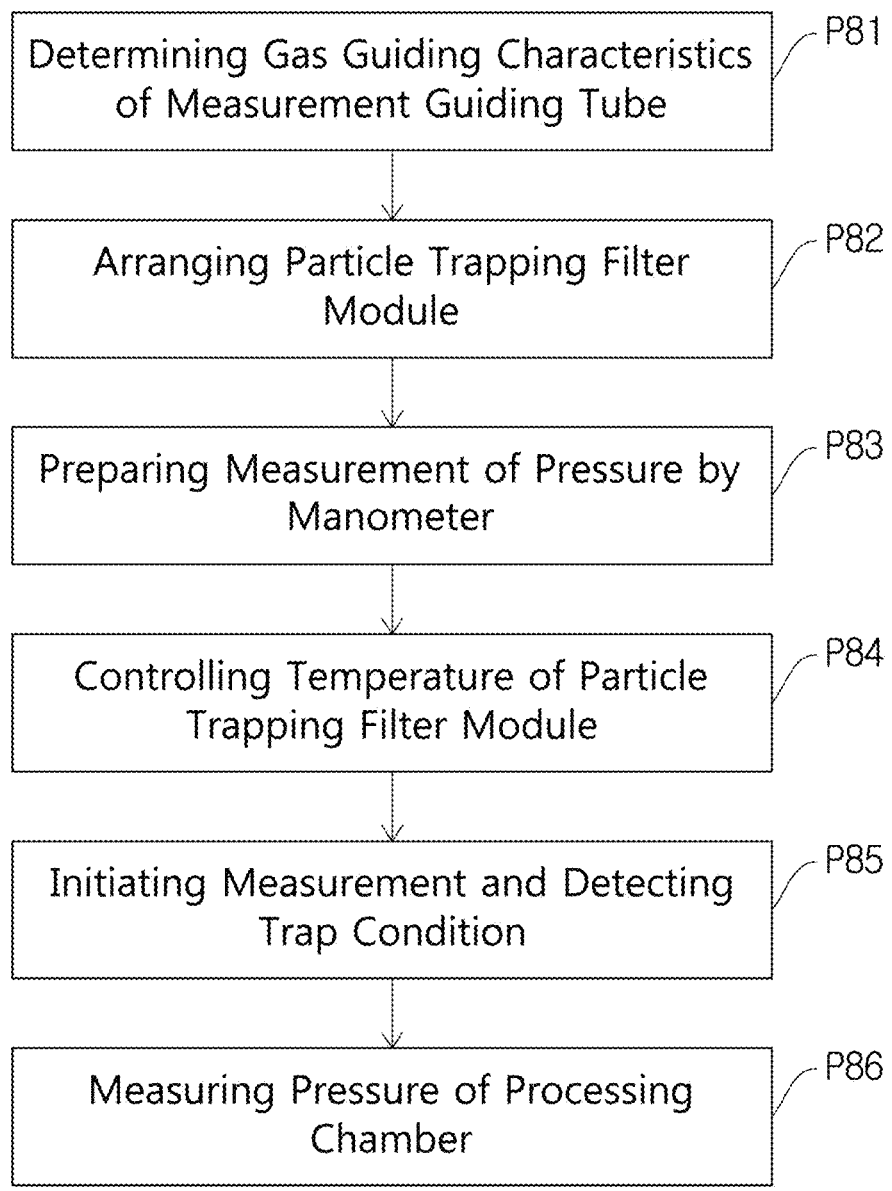
FIG. 8 shows an exemplary embodiment of a process for measuring a pressure of a processing chamber according to present invention.

FIG. 8 shows an exemplary embodiment of a process for measuring a pressure of a processing chamber according to present invention.

Referring to FIG. 8, a method for measuring an inside pressure of a processing chamber with a particle trapping apparatus comprises determining a gas guiding characteristics of a measurement guiding tube P81; arranging a particle trapping filter module at the measurement guiding tube P82; preparing for measuring the inside pressure of the processing chamber using a manometer P83; controlling a temperature of the particle trapping filter module P84; detecting a capturing condition of the particle trapping filter module after initiating a measurement of the pressure by the manometer P85; and detecting the pressure of the processing chamber 86.

The gas guiding characteristics may comprise a characteristic of a flowing gas, an amount of particles in the flowing gas and the like. The particle trapping filter module may be comprised in the particle trapping apparatus, and the particle trapping filter module may be arranged within the measurement guiding tube or may be a part of the measurement guiding tube P82. Optionally, the temperature of the particle trapping filter may be controlled P84, and a particle trapping degree of the particles trapping filter module may be detected P85. The pressure of the processing chamber may be detected precisely without an error by the particle trapping filter module P86. The pressure of the processing chamber may be measured in various ways, not limited to.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A particle trapping apparatus for preventing an error of a pressure measurement, comprising;
   a pressure-measuring means;
   a measuring pipe for connecting the pressure-measuring means to a processing chamber; and
   a trapping means for capturing particles in a gas flowing through the measuring pipe, the trapping means comprising: a filtering block for capturing the particles,
   wherein the trapping means is coupled to the measuring pipe or is a portion of the measuring pipe,
   wherein the filtering block comprises:
   a pair of filter cases having a hollow cylindrical shape;
   a plurality of porous plates arranged within the pair of the filter cases; and
   a plurality of fixing tabs formed on an inner surface of each filter case and arranged separately from each other and successively along a longitudinal direction of each filter case, and
   wherein each of the porous plates contains a plurality of holes and is secured within the filter cases with the fixing tabs, and the holes formed in adjacent porous plates are located on different straight lines according to a flowing direction of the gas.

2. The apparatus according to claim 1, wherein the trapping means further comprises a heat regulating means for regulating a temperature of the gas.

* * * * *